United States Patent [19]

Urbach et al.

[11] Patent Number: 4,509,324
[45] Date of Patent: Apr. 9, 1985

[54] DIRECT OPEN LOOP RANKINE ENGINE SYSTEM AND METHOD OF OPERATING SAME

[76] Inventors: Herman B. Urbach, Rte. 2, 1355 Tydings Rd.; Earl R. Quandt, 203 Winchester Rd., both of Annapolis, Md. 21401

[21] Appl. No.: 492,860

[22] Filed: May 9, 1983

[51] Int. Cl.³ .......................... F02C 1/06; F02C 6/00; F02C 7/00; F02C 7/08
[52] U.S. Cl. ................... 60/39.17; 60/39.5; 60/39.55; 60/39.58
[58] Field of Search ............. 60/39.05, 39.161, 39.17, 60/39.5, 39.511, 39.53, 39.54, 39.55, 39.58, 39.182, 39.3

[56] References Cited

U.S. PATENT DOCUMENTS

| 3,038,308 | 6/1962 | Fuller | 60/39.55 |
| 3,134,228 | 5/1964 | Wolansky et al. | 60/39.55 |
| 3,449,908 | 6/1969 | Aguet | 60/39.3 |
| 4,128,994 | 12/1978 | Cheng | 60/39.05 |

FOREIGN PATENT DOCUMENTS 774425 5/1957 United Kingdom ............... 60/39.58

OTHER PUBLICATIONS

Gasparovic, "Gas Turbine Cycle Operating Partly at Sub-Atm. Pressure", *Naval Eng. J.*, Dec. 74, pp. 81–90.

Primary Examiner—Louis J. Casaregola
Assistant Examiner—Donald E. Stout
Attorney, Agent, or Firm—R. F. Beers; L. A. Marsh

[57] ABSTRACT

A shipboard engine system and method of operating includes two compressors with an intercooler, a compressor turbine, a power turbine, a combustor for combining fuel, air and water. Heat exchangers remove heat from the exhaust and use it to preheat the water to the combustor. Spray condensers recover water from the exhaust for reuse. Water purification apparatus is used to remove acid from the water. The system is designed for stoichiometric operation at full load and run with increased efficiency at part load to give a total lower fuel consumption.

8 Claims, 4 Drawing Figures

DIRECT OPEN LOOP RANKINE ENGINE SYSTEM AND METHOD OF OPERATING SAME

The invention described herein may be manufactured and used by or for the Government of the United States of America for governmental purposes without the payment of any royalties thereon or therefore.

BACKGROUND OF THE INVENTION

1. Field of the Invention

This invention relates to an engine for ships and more particularly to an open cycle Rankine engine on a ship which operates at the point of maximum specific horsepower.

2. Description of the Prior Art

In addition to the usual problems and restrictions besetting permanently installed powerplants such as requirements for fuel efficiency, cost, pollution control, and power, shipboard engines have special restrictions as to space and weight. Also, the conventional requirements for power and fuel efficiency are even more important than in other plants since not only is the cost of running the equipment involved, but the ability to patrol longer and to pursue the enemy more quickly. Therefore, efficiency and compactness produce enormous advantages which are not measurable in dollars and cents. Also, since the ship must be able to vary its speed, the engine must be able to retain its efficiency over a range of power loads.

In order to accomplish these many goals, various engines have been designed for shipboard and land-based powerplants. One system currently utilized for some Naval ships is a gas turbine based on a simple-cycle Brayton engine, designated the LM2500 and built by General Electric. While this system is generally reliable and efficient, it requires a very large and heavy eductor (stack) system which is a major handicap onboard a ship. In addition, this heavy stack forms the uppermost part of the ship adding a great deal of instability to the craft. Where the stack emerges through the decks it also occupies considerable space which would be better used for weaponry or other uses.

Many other systems have been proposed to improve such characteristics as fuel efficiency, power, total weight, or other factors. Many of such systems utilize Rankine or Brayton cycles and add regenerators or multiple serial compressors to increase performance. In some systems, water or steam is added to the products of combustion. Some examples of such prior art systems include powerplants shown in U.S. Pat. Nos. 3,335,565, 2,678,531, 3,449,908, and 3,461,667. While some factors are improved in these various systems, the basic problem of maximizing performance while minimizing weight and space remains.

Another concept using a dual-fluid cycle engine system has been proposed by Dah Yu Cheng in U.S. Pat. Nos. 3,978,661, 4,128,994, and 4,297,841. This device utilizes a Brayton cycle engine with steam injection operating at the point of maximum thermal efficiency. The steam is heated using a waste heat boiler and water may be recovered from the exhaust gases. While this system has improved characteristics over many prior art systems, it is still not a perfect powerplant system, especially for shipboard use. In particular, problems of fresh water procurement, stack weight, and space have not been addressed and partial load performance has not been as efficient as design point performance.

SUMMARY OF THE INVENTION

The present invention provides an improved shipboard power system using an open-loop Rankine cycle engine which operates near the point of maximum thermal efficiency at part-load conditions, and at the point of maximum specific horsepower at peak load conditions. Since the point of maximum specific horsepower is the stoichiometric point, the working fluid is used at maximum power density. Thus, the system becomes compact and lowers the system costs per unit of power. Also, stoichiometric operation reduces the size and weight of the stack and eductor systems. Thus, the system also has a lower center of gravity, making the ship more stable.

Accordingly, one object of the invention is to provide an improved, less costly powerplant for ships and land operations.

Another object of the invention is to provide an improved engine for a ship which operates at the stoichiometric point of maximum specific horsepower.

A further object of the invention is to provide an engine system which is small in physical volume.

A still further object of the invention is to provide a shipboard engine which enhances the stability of the ship.

Another object of the invention is to provide an engine which achieves minimum fuel consumption levels at partial loads.

A still further object of the invention is to provide an engine which is efficient to operate, over the entire power profile of the ship, thus providing a greater range of operation for the ship.

Other objects, advantages, and new features of the invention will become apparent from the following detailed description of the invention when considered in conjunction with accompanying drawings wherein:

DESCRIPTION OF THE PREFERRED EMBODIMENT

Figure 1:
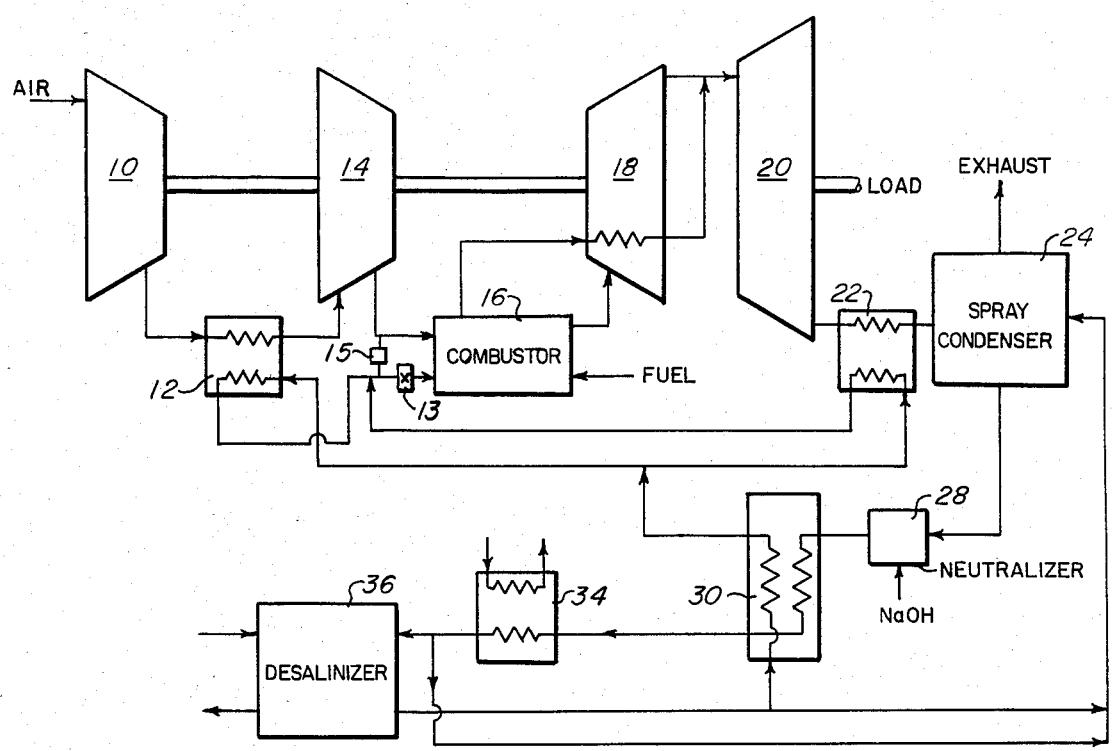
FIG. 1 is a schematic of the first embodiment of the invention.

Referring now to the drawings wherein like reference characters designate identical or corresponding parts throughout the several views and more particularly to FIG. 1 wherein the overall arrangement of the first embodiment is shown as including a first compressor 10 receiving ambient air at the input and producing compressed air at the output. The compressed air is cooled in intercooler 12 and further compressed in a second compressor 14. The compressed air is used to burn fuel in the combustor 16 in the presence of steam injected by steam injection means 13. A regulating means 15 regulates the amount of steam, fuel and compressed air introduced into the combustion chamber 16 in a predetermined manner to ensure operation of the engine system at the stoichiometric point 44 and along a predetermined power profile curve (solid line of FIG. 2) over a 4-to-1 power turndown ratio, and below the Simple Cycle point 48 (dashed line of FIG. 2). The products of combustion are used to drive the compressor turbine 18, which drives the compressors 10, 14 and the power turbine 20, which drives the load. The exhaust from the power turbine 20 is cooled in waste heat boiler 22 and then sent through spray condenser 24 to recover water from the exhaust. The remaining gases exit the system through the exhaust stack.

At the same time, fresh water is being circulated through the system and used as coolant in intercooler 12 and waste heat boiler 22. In the process of performing the cooling, the water is converted into steam. The steam from both devices is combined into a single flow. Most of the steam is delivered to the combustor to control combustor temperature. A portion of the steam, removed while still cold is used as a coolant in the compressor turbine. After being used as a coolant, the steam is added to the input to the power turbine which already contains the products of combustion, including the steam injected into the combustor.

In order to recover fresh water from the steam, a spray condenser 24 is placed in the exhaust system. The spray condenser sprays fresh water into the exhaust, thus cooling it to the point at which steam is condensed and recovered with the sprayed water. Since sulphur is present in most fuels, the water recovered from the exhaust contains considerable sulphuric and sulphurous acid produced in the burning process. This acid must be neutralized before the water is recirculated to prevent system damage. Neutralizer 28 receives the acid water and neutralizes it with sodium hydroxide (NaOH). The neutralized water, which contains considerable amounts of salts from the neutralization process, passes through heat exchnger 30 to be cooled and heat exchanger 34 to be further cooled by sea-water. The cooled neutralized water may then be desalinized in desalinizer unit 36. This unit may contain reverse osmosis devices and deionizers to remove the salt or distillation units may be used. Seawater is used as necessary for cooling and returned to the sea.

The output of the desalinizer unit 36 is used to feed the spray of the spray conditioner 24 and also used as the coolant in heat exchanger 30. The output of heat exchanger 30 is thus preheated and used as the input of coolant to intercooler 12 and waste heat boiler 22. Some of the neutralized water bypasses the desalinization unit and is returned directly to the spray conditioner. Table 1 indicates thermodynamic conditions at selected points in the system.

TABLE 1

Station Conditions for an Open-Cycle Rankine System

| Station | Temperature °R | Temperature °K | Pressure Psi | Pressure MPa | Enthalpy BTU/lb | Enthalpy KWh/kg | Weight Fraction Water |
|---|---|---|---|---|---|---|---|
| Input 10 | 560. | 311. | 14.70 | 0.1014 | 133.8 | 311.2 | .0 |
| Output 10 | 1048. | 362.5 | 95.27 | .657 | 245.3 | 570.6 | .0 |
| Output 12 | 664.2 | 369. | 92.41 | .6372 | 158.8 | 369.4 | .0 |
| Output 14 | 1215. | 675. | 587.8 | 4.054 | 295.1 | 186.4 | .0 |
| Coolant Input 18 | 943.7 | 524.3 | 587.8 | 4.054 | 203. | 2798. | 1 |
| Output 16 | 2660. | 1478. | 561.4 | 3.872 | 1404. | 1266. | .244 |
| Output 18 | 2735. | 1519. | 212.1 | 1.463 | 1145. | 1663. | .244 |
| Input 20 | 2129 | 1183. | 212.1 | 1.463 | 1185. | 1756. | .276 |
| Output 20 | 1299. | 722. | 15.97 | .101 | 580.5 | 583. | .276 |
| Output 22 | 818.4 | 454.7 | 15.33 | .057 | 416.1 | 167.8 | .276 |
| Exhaust | 585. | 325. | 14.95 | .031 | 80.1 | 418.9 | .0 |
| Input 28 | — | — | — | — | — | — | — |
| Coolant Input 12, 22 | 625. | 347.2 | 597 | 4.117 | 28.2 | 298.2 | 1 |
| Coolant Output 22 | 943.7 | 524.3 | 587.8 | 4.054 | 1060. | 1465. | 1 |
| Coolant Output 12 | 937.8 | 521. | 587.8 | 4.054 | 462.2 | 1075. | 1 |

Historically, there has long been an interest in steam-injected systems since they exhibit higher efficiency and increased specific horsepower. Such systems include many well-known gas turbines produced, for example, by Westinghouse and General Electric. The present invention is an improved system using steam injection and is best described as an Open Loop Rankine Engine System.

It is known that at turbine inlet temperatures of about 1000° F. traditional Rankine engines exhibit higher efficiencies than gas turbine (Brayton cycle) engines. Calculations indicate that this superiority would be maintained at higher temperatures and pressures since compression of liquid requires less work than compression of gas. However, it is difficult to realize this advantage at high temperatures since it is difficult to sustain high pressure across a boiler tube wall at the 2200° F. turbine inlet temperature characteristic of many Brayton cycle systems. However, an open-cycle Rankine engine having the steam included in the combustion gases allows the advantage to be utilized.

Figure 2:
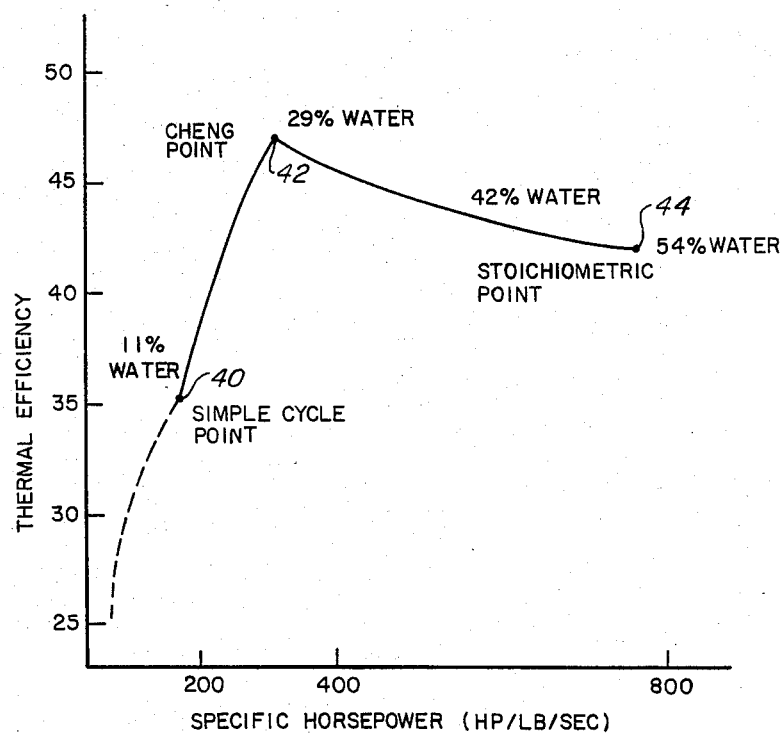
FIG. 2 is a graph of a predetermined power profile curve showing the relation between specific horsepower and thermal efficiency.

Given this type of system, many parameters may be varied to give differing results in terms of power and efficiency of the engine. As can be seen in FIG. 2, the graph comparing specific horsepower to thermal efficiency, while having a constant turbine temperature input of 2200° F., gives a distinctive curve, i.e., the predetermined power profile curve. From the simple cycle (gas turbine) point 40, the predetermined power profile curve rises sharply to a point 42 and then drops off more slowly until the curve ends at the stoichiometric point 44. The crop is specific horsepower as the predetermined power profile curve is traversed from the stoichiometric point 42 to the simple cycle point 40 is denominated as the power turndown ratio. As illustrated for the predetermined power profile curve of FIG. 2, the power turndown ratio is approximately 4-to-1. The amount of water added is varied to move from point to point along the predetermined power profile curve curve. At the simple cycle point, only 11% of the mass amount of air is water. At the Cheng point, i.e., point 42 water accounts for 29%. At the stoichiometric point, water is 54%. It is clear that the point of maximum thermal efficiency occurs at point 42. The use of this point as the design criterion is seen in the Cheng patents, such as U.S. Pat. No. 4,128,994. While this would, at first, seem to be the most favorable design point, many other factors show that this is not ideal for shipboard use.

Operation of the engine at the Cheng point 42 necessitates the addition of considerable amounts of air per unit amount of fuel. The stoichiometric point 44, by definition is the point at which all of the fuel and air is used up in the combustion process. Normally, since air is free, there is no harm and considerable economy in using the Cheng point 42 instead of the stoichiometric point 44 as the design point. However, on board a ship this produces considerable problems. The additional working fluid i.e., air, means that larger compressors, heat exchangers and engine systems in general are required which means greater costs per unit power. Moreover, more air implies a considerably larger amount of exhaust which requires a much larger stack system. As the stack size increases, considerable weight is added to the ship. While this condition is undesirable per se, it is aggravated by the fact that the additional weight is added to the topmost parts of the ship, raising the center of gravity, and reducing its stability. By using only the minimum amount of air necessary for combustion at the stoichiometric point 44, the engine is more cost effective at maximum specific horsepower power, while reducing the overall weight, instability, and wasted deck space of the ship. On a destroyer using the present engine system, the weight of the stack may be reduced by 75%, giving a weight saving of about 150 tons. This saving must be offset by the increased water treatment equipment and supplies needed to produce the additional water needed for combustion. However, even with this offset, the present system is at worst equal in weight to the current LM2500 systems now in use. Even if the weights are equal, the present system is superior in distribution since most of the weight is below decks making the ship stable. In addition, the total volume is only approximately ½ of conventional systems. A comparison of the size and weight of the present invention is compared to a conventional system in Table 2.

Cheng system engine, moving away from the design point 42 requires that thermal efficiency drop off quickly toward the simple cycle point 40. In an open cycle Rankine system, departure from the stoichiometric point 44 means that engine thermal efficiency increases toward the Cheng point 42. Finally, at 43% of design load, the open-cycle Rankine engine operates at the Cheng point 42 of highest thermal efficiency.

When logs of ships are consulted, it becomes clear that ships run at half speed or less over 50% of the time and run over three-quarters speed only a small percentage of the time. Thus, it is illusory to only consider the full power design load when calculating efficiency of an engine. When the fuel consumption is integrated over the curve and weighted according to the speed of the ship, it is quickly evident that the total amount of fuel utilized is considerably smaller (about 30% smaller) when a stoichiometric point engine is used rather than a Cheng point engine. While this is a desirable result, from the cost of fuel involved, it is even more important for a military ship since it gives a tactical advantage in increasing the amount of time the ship may patrol.

The part load behavior of prior art open-cycle Brayton systems involves control of a fuel throttle and control of the compressor stator angle. This decreases the fuel-air ratio and the turbine-inlet temperature. This is necessary because the lower pressures generated at lower speeds cannot provide sufficient heat to maintain turbine flow rates without choking. Thus, for simple cycles, the part-load behavior has a lower turbine-inlet temperature and poor overall thermodynamic efficiencies. In the present system, choking of the turbine flow is avoided by reducing the steam flow while maintaining a constant turbine inlet temperature. When the steam flow rate is reduced, the character of the cycle changes and passes through the Cheng point of maximum efficiency. The intercooler 12, waste heat boiler 22 and heat exchanger 30 act to recover unwanted heat and return it to the system. This adds efficiency to the system.

Steam is used as the coolant in turbine 18 rather than air since the heat capacity of steam is twice that of compressed air, and hence more effective. This also eliminates the need to compress the coolant air. The steam entering the compressor turbine 18 and the combustor 16 is at the same pressure as the compressed air out of compressor 14, but considerably cooler (for ex- TABLE 2
A COMPARISON OF SIZE AND WEIGHT OF A CONVENTION SYSTEM AND THE PRESENT INVENTION

| | CONVENTIONAL SYSTEM | | | | PRESENT INVENTION | | | |
|---|---|---|---|---|---|---|---|---|
| | Volume | | Weight | | Volume | | Weight | |
| | ft³ | (m³) | tons | (m tons) | ft³ | (m³) | tons | (m tons) |
| Turbine | 4124. | (116) | 88.7 | (80.5) | 6211 | (176.4) | 86.2 | (78.2) |
| Water system | — | | | | 4881 | (138.2) | 162.0 | (146.8) |
| Distillation | 1290. | (36.5) | 10 | (9.1) | — | | | |
| Stack System | 30924. | (876.) | 206.5 | (187.4) | 7731 | (219.) | 51.8 | (47.0) |
| Total | 36338. | (1029) | 305.2 | (277.0) | 18882. | (533.4) | 300. | (272.3) |

Figure 3:
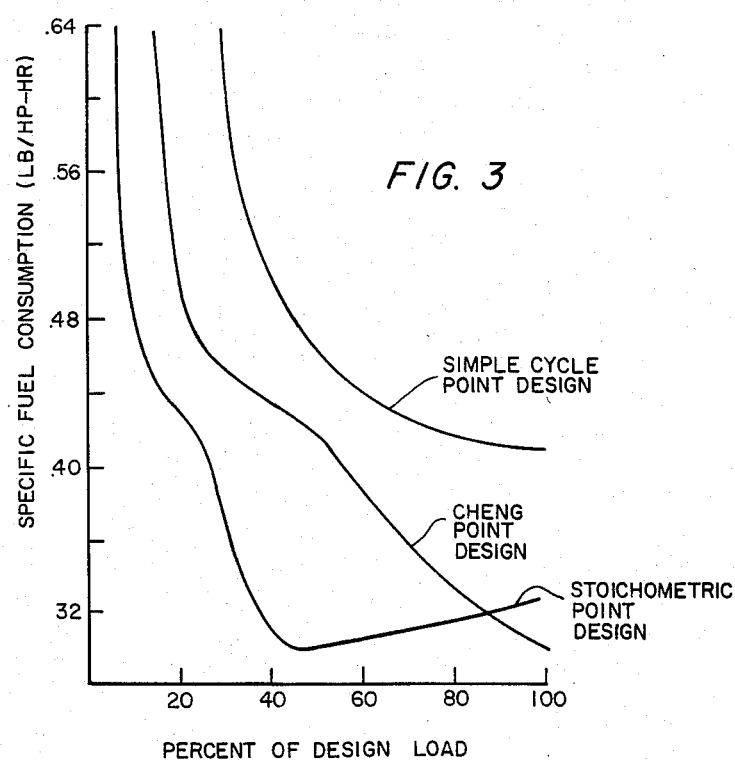
FIG. 3 is a graph showing the relation between specific fuel consumption and percent of design load.

FIG. 3 shows a graph of specific fuel consumption versus percent of design load. As expected from the graph in FIG. 2, at the design load, an engine using the Cheng point design has a lower fuel consumption. However, at part load, the Cheng point engine quickly loses fuel effiency while the present engine actually gains fuel efficiency until power decreases below 40% of design load. The reason for this is easily seen. In a ample, 484° F. compared to 755° F.).

If the sulphur content of the fuel burned is 1% (maximum allowed for Navy fuel), the water recovered may have a pH around 1. Since an inventory of 900 tons of fuel may be carried, a maximum of 51 tons of NaOH may be needed for neutralization. Considerably less may be needed if cleaner fuel is used. The total weight for consumables and water treatment facilities for a destroyer may approach 162 tons, but this is still not dis-advantageous when the savings in weight of the stacks is considered as shown in Table 2 above.

Figure 4:
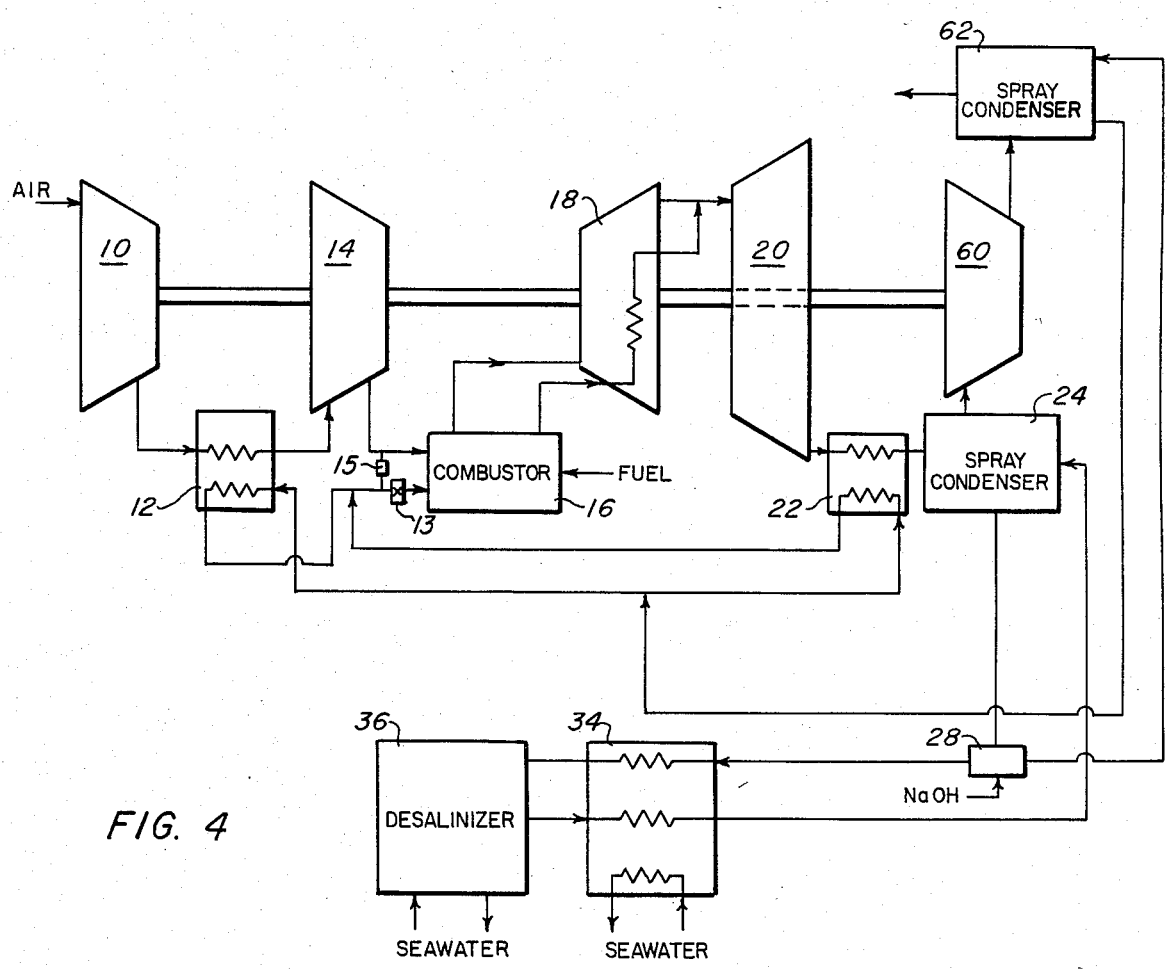
FIG. 4 is a schematic of the second embodiment of the invention.

FIG. 4 shows a second embodiment of the invention having some additional features. The basic 2 compressor, 2 turbine engine with intercooler, wasteheat boiler and water recovery system as shown in FIG. 1 is also included here. However, in this embodiment, the effluent gas is allowed to expand below atmospheric pressure to about one half atmospheric in waste heat boiler 22. The expansion ratio is typically around 2.3, but depends on the temperature of the effluent. After cooling, the effluent is compressed back to atmospheric pressure by means of auxiliary compressor 60 driven by the compressor turbine 18. This system recovers some additional rejected waste heat in the effluent gas, thus boosting efficiency and specific horsepower by about 5%. Another spray condenser 62 may also be added to gain additional heat from the effluent gas, although this is not necessary for the working of the auxiliary compressor 60. Since most of the acid is removed in spray condenser 24, the water from the second spray condenser 62 may be added directly to the combustor water.

Obviously, many modifications and variations of the present invention are possible in light of the above teachings. It is therefore to be understood that within the scope of the appended claims the invention may be practiced otherwise than as specifically described.

What is claimed is:

1. An open-cycle Rankine engine system, said open-cycle Rankine engine system having a predetermined power profile curve, comprising:

first compression means for receiving ambient air and outputting a first compressed air flow mass;

cooling means cooperating with said first compression means for extracting a thermal energy of compression from said first compressed air flow mass and outputting a cooled, compressed air flow mass;

second compression means for receiving said cooled compressed air flow mass and outputting a second compressed air flow mass, and wherein said second compressed air flow mass is variable over a range from a predetermined maximum compressed air flow mass to a predetermined compressed minimum air flow mass;

combustion means optimized for stoichiometric combustion of said predetermined maximum compressed air flow mass at a maximum specific horsepower point of said predetermined power profile curve to generate combustion products, said combustion means further optimized to operate at a predetermined maximum combustion temperature during said stoichiometric combustion at said maximum specific horsepower point and wherein said predetermined maximum combustion temperature remains substantially constant over a 4-to-1 power turndown ratio between said maximum specific horsepower point and a Simple Cycle point along said predetermined power profile curve to form said combustion products, such that said combustion means operates at a maximum combustion efficiency at said maximum specific horsepower point and over said 4-to-1 power turndown ratio without flame out and said maximum predetermined compressed air flow mass required during stoichiometric combustion is minimized;

injection means for injecting a predetermined mass of steam-water into said combustion means to form a low temperature steam mass and a combustion gases-steam working fluid, said predetermined steam-water mass being variable over a range from a predetermined maximum steam-water mass to a predetermined minimum steam-water mass, and wherein said predetermined steam-water mass is injected into said combustion means and mixes with said combustion products to form said combustion products-steam working fluid;

first expansion means optimized for receiving and expanding said low temperature steam mass and said combustion gases-steam working fluid to generate a first output power for powering said second and first compression means and outputting an expanded combustion products-steam working fluid, said first expansion means further optimized to operate at a predetermined maximum inlet temperature at said maximum specific horsepower point and wherein said predetermined maximum inlet temperature remains substantially constant over said 4-to-1 power turndown ratio between said maximum specific horsepower point and said Simple Cycle point along said predetermined power profile curve without choking and said first expansion means is cooled by flow of said low temperature steam mass therethrough;

second expansion means for receiving and expanding said expanded combustion products-steam working fluid to generate a second output power for powering a variable load and outputting a combustion products-steam exhaust fluid;

means for regulating said predetermined steam-water mass, said second compressed air flow mass, and a fuel introduced into said combustion means, said regulating means adapted to introduce said predetermined maximum steam-water mass, said predetermined maximum compressed air flow mass and said fuel into said combustion means in a first predetermined manner to cause said stoichiometric combustion at said maximum specific horsepower point of said predetermined power profile curve, said regulating means further adapted to vary said fuel and said predetermined steam-water mass introduced into said combustion means in a second predetermined manner, said predetermined steam-water mass being varied between said predetermined maximum steam-water mass and said predetermined minimum steam-water mass, to cause said open-cycle Rankine engine system to operate along said predetermined power profile curve over said 4-to-1 power turndown ratio between said maximum specific horsepower point and said Simple Cycle point such that said predetermined maximum combustion temperature and said predetermined maximum inlet temperature remain substantially constant over said 4-to-1 power turndown ratio and a thermal efficiency of said open-cycle Rankine engine system increases as it operates along said predetermined power profile curve from said maximum specific horsepower point to a Cheng point, and wherein said regulating means is further adapted to vary said fuel and said second compressed air flow mass, said second compressed air flow mass being varied between said predetermined maximum compressed air flow mass and said predetermined minimum air flow mass, in a third predetermined manner for operation of said open-cycle Rankine engine system below said Simple Cycle point such that an inlet temperature of said first expansion means is less than said predetermined maximum inlet temperature; and means for treating said combustion products-steam exhaust fluid to recover water and waste thermal energy therefrom, said treating means further comprising first heat exchanging means for extracting said waste thermal energy from said combustion products-steam exhaust fluid to produce a cooled exhaust fluid, means for condensing water out of said cooled exhaust fluid to produce adulterated water and exhaust gases, said exhaust gases being exhausted to said ambient air, means for neutralizing said adulterated water to produce neutralized water, second heat exchanging means for cooling said neutralized water to produce cooled neutralized water, and means for desalinizing said cooled neutralized water to produce fresh water, wherein said fresh water cooperates with said second heat exchanging means to form preheated fresh water and a first portion of said preheated fresh water cooperates with said first heat exchanging means to extract said waste thermal energy therefrom to form a first steam-water mass and a second portion of said preheated fresh water cooperates with said cooling means to extract said thermal energy of compression therefrom to form a second steam-water mass such that said first steam-water mass and said second steam-water mass combine to form said predetermined steam-water mass;

whereby said open-cycle Rankine engine system is optimized for full-load operation at said maximum specific horsepower point, for a first part-load operation along said predetermined power profile curve between said maximum specific horsepower point and said Simple Cycle point over said 4-to-1 power turndown ratio, and for a second part-load operation below said Simple Cycle point to significantly reduce fuel consumption of said open-cycle Rankine engine system over an integrated, weighted full load-part load operating cycle thereof and wherein a total volume of said open cycle Rankine engine system is reduced by approximately fifty percent.

2. The open-cycle Rankine engine system as claimed in claim 1, wherein said predetermined steam-water mass further comprises a predetermined mass unit of steam per mass unit of said predetermined maximum compressed air flow mass between said maximum specific horsepower point and said Simple Cycle point, said predetermined mass unit of steam per mass unit of said predetermined maximum compressed air flow mass determined in said second predetermined manner by means of said regulating means.

3. The open-cycle Rankine engine system as claimed in claim 1, wherein said maximum specific horsepower point further comprises a stoichiometric point.

4. The open-cycle Rankine engine system as claimed in claim 1, wherein said predetermined maximum compressed air flow mass further comprises a predetermined stoichiometric air flow mass with respect to said fuel.

5. The open-cycle Rankine engine system as claimed in claim 4, wherein said predetermined maximum steam-water mass further comprises 0.54 mass units of steam-water per mass unit of said predetermined stoichiometric air flow mass, and wherein said predetermined minimum steam-water mass further comprises 0.11 mass units of steam-water per mass unit of said predetermined stoichiometric air flow mass.

6. The open-cycle Rankine engine system as claimed in claim 1, wherein said predetermined maximum inlet temperature further comprises 2200° F.

7. The open-cycle Rankine engine system as claimed in claim 1, wherein said combustion products-steam exhaust fluid treating means further comprises:

said first heat exchanging means optimized for expanding said combustion products-steam exhaust fluid to form said cooled exhaust fluid having a predetermined subatmospheric pressure;

said means for condensing water out of said cooled exhaust fluid having said predetermined subatmospheric pressure optimized to produce adulterated water and subatmospheric exhaust gases; and third expansion means cooperating with said water condensing means for compressing said subatmospheric exhaust gases to an atmospheric pressure and exhausting said compressed exhaust gases to said ambient air such that an additional waste thermal energy is recovered from said combustion products-steam exhaust fluid.

8. The open-cycle Rankine engine system as claimed in claim 7 wherein said combustion products-steam exhaust fluid treating means further comprises secondary condensing means cooperating with said third expansion means for extracting a further waste thermal energy from said compressed exhaust gases.

* * * * *